United States Patent
Avron et al.

(10) Patent No.: US 9,928,214 B2
(45) Date of Patent: Mar. 27, 2018

(54) SKETCHING STRUCTURED MATRICES IN NONLINEAR REGRESSION PROBLEMS

(71) Applicant: INTERNATIONAL BUSINESS MACHINES CORPORATION, Armonk, NY (US)

(72) Inventors: Haim Avron, White Plains, NY (US); Vikas Sindhwani, Hawthorne, NY (US); David P. Woodruff, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 720 days.

(21) Appl. No.: 14/333,978

(22) Filed: Jul. 17, 2014

(65) Prior Publication Data
US 2015/0317282 A1    Nov. 5, 2015

Related U.S. Application Data

(60) Provisional application No. 61/911,786, filed on Dec. 4, 2013.

(51) Int. Cl.
| | |
|---|---|
| *G06F 17/18* | (2006.01) |
| *G06F 17/16* | (2006.01) |
| *G06F 17/10* | (2006.01) |
| *G06F 17/27* | (2006.01) |

(52) U.S. Cl.
CPC .............. *G06F 17/18* (2013.01); *G06F 17/10* (2013.01); *G06F 17/16* (2013.01); *G06F 17/2785* (2013.01)

(58) Field of Classification Search
CPC ...... G06F 17/2785; G06F 17/16; G06F 17/18; G06F 17/10
USPC ........................................... 702/127, 179, 181
See application file for complete search history.

(56) References Cited

U.S. PATENT DOCUMENTS

| | | |
|---|---|---|
| 9,135,567 B2 | 9/2015 | He et al. |
| 9,342,794 B2 | 5/2016 | Mahler et al. |
| 2011/0270835 A1 | 11/2011 | Clarkson et al. |
| 2013/0013659 A1 | 1/2013 | Kankar et al. |

FOREIGN PATENT DOCUMENTS

| | | |
|---|---|---|
| WO | 2007116261 A1 | 10/2007 |

OTHER PUBLICATIONS

Dasarathy et al., "Sketching Sparse Matrices", University of Wisconsin, Madison, Department of Mathematics; Mar. 26, 2013, pp. 1-33; http://www.google.com/url?sa=t&rct=j&q=&esrc=s&source=web&cd=1&ved=0CB0QFjAA&url=http%3A%2F%2Farxiv.org%2Fpdf%2F1303.65448&ei=y-_HU8fKNIJDksASxhoGwBQ&usg=AFQjCNFEbRRp6siRVteAXs3nj802eqrGJQ&bvm=bv.71198958,d.cWc.

(Continued)

*Primary Examiner* — An Do
(74) *Attorney, Agent, or Firm* — Scully, Scott, Murphy & Presser, P.C.; Daniel P. Morris, Esq.

(57) ABSTRACT

A system, method and computer program product for quickly and approximately solving structured regression problems. In one aspect, the system, method and computer program product are applied to problems that arise naturally in various statistical modeling settings—when the design matrix is a Vandermonde matrix or a sequence of such matrices. Using the Vandermonde matrix structure further accelerates the solution of the regression problem, achieving running times that are faster than "input sparsity". The modeling framework speedup benefits of randomized regression for solving structured regression problems.

11 Claims, 10 Drawing Sheets

(56) References Cited

OTHER PUBLICATIONS

Mahoney, "Randomized algorithms for matrices and data", Stanford University, Nov. 2011, pp. 1-50 http://cs.stanford.edu/people/mmahoney . . . .

Qian et al., "Hyperspectral Image Classification Based on Structured Sparse Logistic Regression and Three-Dimensional Wavelet Texture Features", IEEE Transactions on Geoscience and Remote Sensing, vol. 51, Issue: 4, Apr. 2013.

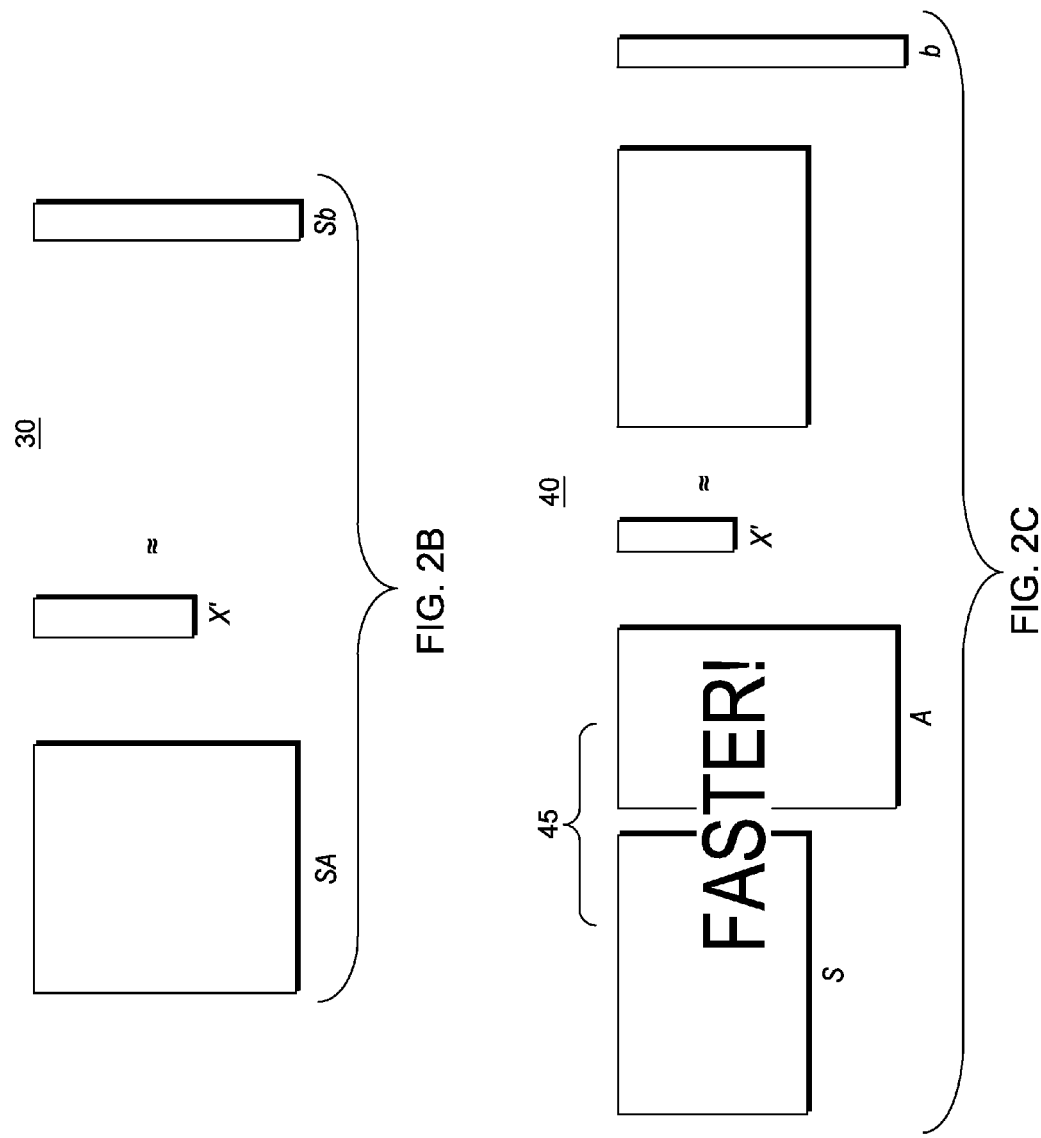

ALGORITHM 1 StructRegression-2

1: INPUT: AN $n \times d$ MATRIX $A$ WITH nnz($A$) NON-ZERO ENTRIES, AN $n \times 1$ VECTOR $b$, AN INTEGER DEGREE $q$, AND AN ACCURACY PARAMETER $\epsilon > 0$.
2: OUTPUT: WITH PROBABILITY AT LEAST .98, A VECTOR $x' \in \mathbf{R}^d$ FOR WHICH $\|T(A)x' - b\|_2 \leq (1 + \epsilon)\min_x \|T(A)x - b\|_2$.
3: LET $\Pi = \Phi D$ BE A SPARSE EMBEDDING MATRIX FOR THE $\ell_2$ NORM WITH $t = O((dq)^2/\epsilon^2)$.
4: COMPUTE $\Pi T_q(A)$ USING THE EFFICIENT ALGORITHM OF LEMMA 9 WITH $E$ SET TO THE IDENTITY MATRIX.
5: COMPUTE $\Pi b$.
6: COMPUTE $\Pi'(\Pi T_q(A))$ AND $\Pi'\Pi b$, WHERE $\Pi'$ IS A SUBSAMPLED RANDOMIZED HADAMARD TRANSFORM OF THEOREM 7 WITH $t' = O(\epsilon^{-2}(\log(dq))(\sqrt{dq} + \sqrt{\log t})^2)$ ROWS.
7: OUTPUT THE MINIMIZER $x'$ OF $\|\Pi'\Pi T_q(A)x' - \Pi'\Pi b\|_2$.

FIG. 5

ALGORITHM 1 StructRegression-1

150

1: INPUT: AN $n \times d$ MATRIX $A$ WITH nnz($A$) NON-ZERO ENTRIES, AN $n \times 1$ VECTOR $b$, AN INTEGER DEGREE $q$, AND AN ACCURACY PARAMETER $\varepsilon > 0$.
2: OUTPUT: WITH PROBABILITY AT LEAST .98, A VECTOR $x' \in \mathbf{R}^{d^q}$ FOR WHICH $\|T_q(A)x' - b\|_1 \leq (1+\varepsilon)\min_x \|T_q(A)x - b\|_1$.
3: LET $\Psi = \Pi E = \Phi DE$ BE A SUBSPACE EMBEDDING MATRIX FOR THE $\ell_1$ NORM WITH $t = (dq+1)^{1+\gamma}$ FOR AN ARBITRARILY SMALL CONSTANT $\gamma > 0$.
4: COMPUTE $\Psi T_q(A) = \Pi E T_q(A)$ USING THE EFFICIENT ALGORITHM OF LEMMA 9.
5: COMPUTE $\Psi b = \Pi E b$.
6: COMPUTE A QR-DECOMPOSITION OF $\Psi(T_q(A) \circ b)$, WHERE $\circ$ DENOTES THE ADJOINING OF COLUMN VECTOR $b$ TO $T_q(A)$.
7: LET $G$ BE A $(dq+1) \times O(\log n)$ MATRIX OF i.i.d. GAUSSIANS.
8: COMPUTE $R^{-1} \cdot G$.
9: COMPUTE $(T_q(A) \circ b) \cdot (R^{-1}G)$ USING THE EFFICIENT ALGORITHM OF LEMMA 10 APPLIED TO EACH OF THE COLUMNS OF $R^{-1}G$.
10: LET $S$ BE THE DIAGONAL MATRIX OF THEOREM 6 FORMED BY SAMPLING $\bar{O}(q^{1+\gamma/2} d^{4+\gamma/2} \varepsilon^{-2})$ ROWS OF $T_q(A)$ AND CORRESPONDING ENTRIES OF $b$ USING THE SCHEME OF THEOREM 6.
11: OUTPUT THE MINIMIZER $x'$ of $\|ST_q(A)x' - Sb\|_1$.

FIG. 6

| DATASET | ORD. REG. | ADD. POLY. REG. | ADD. POLY. REG. W/ RANDOM FEATURES | ORD. REG. W/ FOURIER FEATURES |
|---|---|---|---|---|
| MNIST CLASSIFICATION $n = 60,000$, $d = 784$ $k = 10,000$ | 14% 3.9 SEC | 11% 19.1 SEC $q = 4$ | 6.9% 5.5 SEC $D = 300$, $q = 4$ | 7.8% 6.8 SEC $D = 500$ |
| CPU REGRESSION $n = 6,554$, $d = 21$ $k = 819$ | 12% 0.01 SEC | 3.3% 0.07 SEC $q = 4$ | 2.8% 0.13 SEC $D = 60$, $q = 4$ | 2.8% 0.14 SEC $D = 180$ |
| ADULT CLASSIFICATION $n = 32,561$ $d = 123$ $k = 16,281$ | 15.5% 0.17 SEC | 15.5% 0.55 SEC $q = 4$ | 15.0% 3.9 SEC $D = 500$, $q = 4$ | 15.1% 3.6 SEC $D = 1000$ |
| CENSUS REGRESSION $n = 18,186$, $d = 119$ $k = 2,273$ | 7.1% 0.3 SEC | 7.0% 1.4 SEC $q = 4$ $\lambda = 0.2$ | 6.85% 1.9 SEC $D = 500$, $q = 4$ $\lambda = 0.1$ | 6.5% 2.1 SEC $D = 500$ $\lambda = 0.1$ |
| FOREST COVER CLASSIFICATION $n = 522,910$ $d = 54$ $k = 58,102$ | 25.7% 3.3 SEC | 23.7% 7.8 SEC $q = 4$ | 20.0% 14.0 SEC $D = 200$, $q = 4$ | 21.3% 15.5 SEC $D = 400$ |

FIG. 7

SKETCHING STRUCTURED MATRICES IN NONLINEAR REGRESSION PROBLEMS

CROSS-REFERENCE TO RELATED APPLICATIONS

This disclosure relates to and claims the benefit of the filing date of applicants' U.S. Provisional Patent Application No. 61/911,786 filed Dec. 4, 2013 the whole contents and disclosure of which is incorporated by reference herein.

GOVERNMENT CONTRACT

This invention was made with Government support under Contract No.: FA8750-12-C-0323 awarded by Defense Advanced Research Projects Agency. The Government has certain rights in this invention.

BACKGROUND

The disclosure relates to the field of predictive analytics generally, and particularly, to an efficient and scalable predictive analytics system based on sketching structured matrices in nonlinear regression problems.

A basic statistical problem that arises pervasively in data analytics applications is non-linear regression. On big datasets, solving such problems is computationally very challenging.

While development of randomized techniques for solving linear least squares regression and least absolute deviation problems exist, they do not exploit structure that is commonly found in regression problems. For example, in the polynomial fitting problem and certain kernel regression problems, the design matrix is heavily structured, which conceivably could lead to faster methods for solving the regression problems.

What is needed is a method to exploit this structure.

SUMMARY

This disclosure provides a system and method running a sketching based algorithm to numerical linear algebra problems, including polynomial fitting and structured regression.

In one embodiment, the method quickly and approximately solves structured regression problems when the design matrix is a Vandermonde matrix or a sequence of such matrices which problems arise naturally in various statistical modeling settings, including classical polynomial fitting problems, additive models and approximations to recently developed randomized techniques for scalable kernel methods.

This Vandermonde matrix structure can be exploited to further accelerate the solution of the regression problem, achieving running times that are faster than "input sparsity" (i.e., the time it takes to write down the matrix describing the regression problem).

In one aspect, there is provided a computer-implemented method for solving fast nonlinear regression and classification problems. The method comprises: sketching an input data and output data using sparse embedding matrices and structured random matrices; utilizing structure in the input data and output data to accelerate sketching, said structure is a Vandermonde matrix form; and solving a regression problem on the sketched data.

In a further aspect, there is provided a system for solving fast nonlinear regression and classification problems comprising: a memory; and a hardware processor device coupled to the memory configured to perform a method comprising: sketching an input data and output data using sparse embedding matrices and structured random matrices; utilizing structure in the input data and output data to accelerate sketching, said structure is a Vandermonde matrix form; and solving a regression problem on the sketched data.

In a further aspect, a computer program product is provided for performing operations. The computer program product includes a storage medium readable by a processing circuit and storing instructions run by the processing circuit for running a method. The method is the same as listed above.

BRIEF DESCRIPTION OF DRAWINGS

Embodiments will now be described by way of non-limiting examples with reference to the following figures:

FIGS. 2A-2C show aspects of the predictive analytics methodology of the present invention with: FIG. 2A showing a first step 20 of a general method of applying a sketching matrix S; FIG. 2B shows a reformed regression problem 30 after applying the sketching matrix S; and FIG. 2C shows a depiction of the application of sketching matrix S and the indication that both S and A are structured to allow increased processing speed;

FIG. 4 shows a data structure 70 used in Vandermonde matrices to help achieve a faster processing method, and indicates several applications, such as polynomial fitting and multivariate polynomial fitting;

FIG. 5 depicts a first sketching matrix multiplcation algorithm entitled Algorithm 1 (StructRegression-2) 100 in one embodiment;

FIG. 6 depicts a second sketching matrix multiplcation algorithm entitled Algorithm 2 (StructRegression-1) 150 in one embodiment;

FIG. 7 shows a comparison of testing error and training time of the different methods in the form of a generalization performance Table 175;

DETAILED DESCRIPTION

A system and method uses certain randomized sketching and sampling transforms to drastically compress big datasets while preserving its key properties. This allows analytics to run very fast on relatively small data sketches, but achieve the same or similar quality of output as if it were run on the entire dataset.

The system and method performs predictive analytics by applying sketching/sampling ideas for non-linear regression, and to problems involving certain structured matrices.

Figure 1:
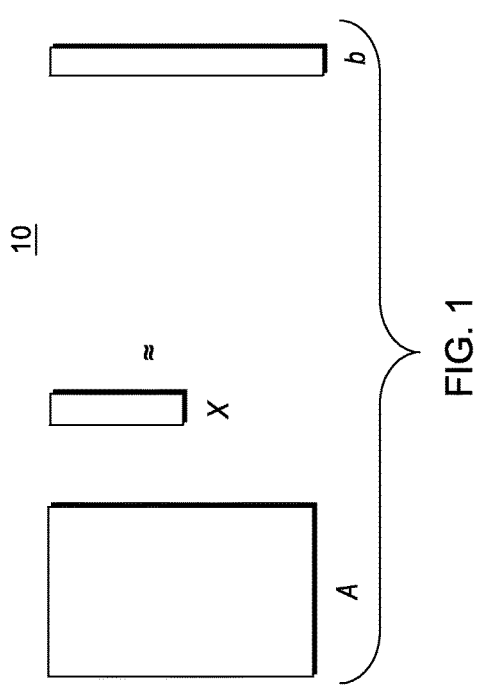
FIG. 1 shows an overview of the regression problem solved according to the methods described herein.

FIG. 1 shows a conceptual depiction of the regression problem written in algebraic form. In FIG. 1, the regression problem 10 is to find a matrix "x" such that matrix "Ax" is as close to a vector "b" (list of values) as possible given the class of regression problems: $\min_x |Ax-b|_p$.

In the embodiments discussed herein, matrix A is of a block-Vandermonde structured matrix. Closeness is measured according to the Lp measure which is a regression a measure of how good the curve is. Different values of p in "lp" regression corresponds to different errors e.g., p=1 sum of distances of each data point to the curve, p=2 is the sum of the squares of the distances to the curve of each data point.

Figure 2A:
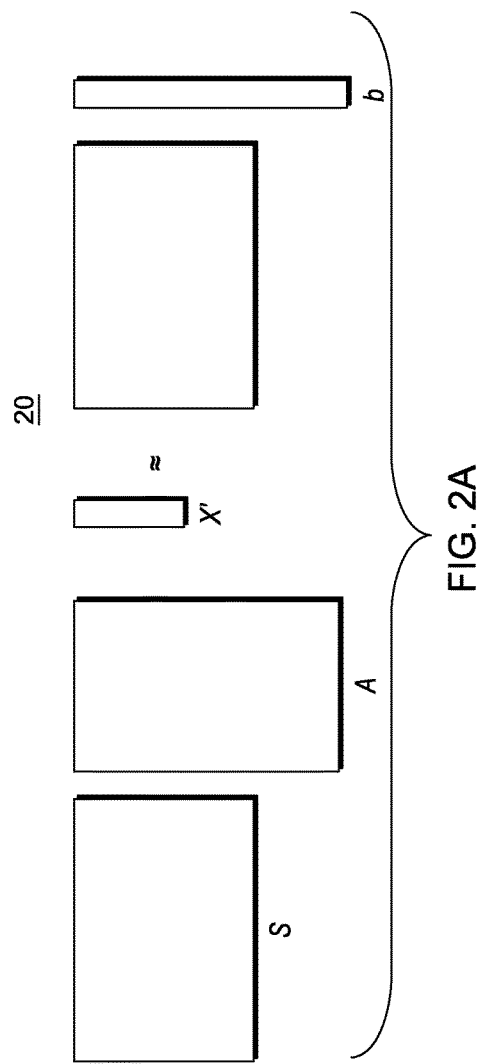

FIGS. 2A-2C depicts the methodology of the embodiments discussed herein.

FIG. 2A shows a first step 20 of a general method of applying a sketching matrix S to the matrix A and the vector b. That is, the method implemented by a programmed computer system first computes the following products: S*A and S*b, a matrix-matrix product and a matrix-vector product, respectively. The sketching matrix S has a single non-zero entry per column. Matrix A has a fast vector-matrix method associated with it since it is a Vandermonde structured matrix. The matrix SA is reduced in size to a smaller matrix than "A", as is vector "sb" being reduced in size to a smaller vector than "b".

FIG. 2B shows a reformed, i.e., new, regression problem 30 after applying the sketching matrix S, namely, that of solving $\min_x |SA_x-Sb|_p$. To solve this reduced problem, any algorithm for "lp" regression can be used as a "black box" processing. The "SA" matrix can be computed much faster if "S" is a type of Sketching matrix and if the polynomial matrix A has the Vandermonde form. The "Sb" vector can be computed much quicker as well such that the regression problem as a whole is processed much quicker.

FIG. 2C shows a depiction 40 of the application of sketching matrix S and the indication 45 that both S and A are structured to allow increased processing speed. Namely, the matrix-matrix computation of S*A is performed very quickly using that: (1) S has a single non-zero entry per column, and (2) A has a fast vector-matrix method associated with it since it is a Vandermonde matrix.

With more particularity, as described in greater detail herein below, there is considered the following class of regression problems of the type in equation 1) as follows:

$$\operatorname*{argmin}_{x \in C} \|Zx - b\|_p, \text{ where } p = 1, 2 \quad (1)$$

where C is a convex constraint set, $Z \in R^{n \times k}$ is a sample-by-feature design matrix, and $b \in R^n$ is the target vector. It is assumed henceforth that the number of samples is large relative to data dimensionality (n>>k). The setting p=2 corresponds to classical least squares regression, while p=1 leads to least absolute deviations fit, which is of significant interest due to its robustness properties. The constraint set C can incorporate regularization. When $C=R^k$ and p=2, an ε-optimal solution can be obtained in time $O(nk \log k)+(k\epsilon^{-1})$ using randomization, which is much faster than an $O(nk^2)$ deterministic solver when ε is not too small (dependence on ε can be improved to $O(\log(1/\epsilon))$ if higher accuracy is needed). Similarly, a randomized solver for $l_1$ regression runs in time $O(nk \log n)+(k\epsilon^{-1})$.

In many settings, what makes such acceleration possible is the existence of a suitable oblivious subspace embedding (OSE). An OSE can be thought of as a data-independent random "sketching" matrix $S \in R^{r \times n}$ whose approximate isometry properties over a subspace (e.g., over the column space of Z,b) imply that, $$\|S(Zx-b)\|_p \approx \|Zx-b\|_p \text{ for all } x \in C,$$

which in turn allows x to be optimized over a "sketched" dataset of much smaller size without losing solution quality. Sketching matrices include Gaussian random matrices, structured random matrices which admit fast matrix multiplication via FFT-like operations, and others.

In one aspect, the present method non-trivially exploits additional structure in Z to further accelerate runtime. For example, it is known that when Z is sparse and has nnz(Z)= nk non-zeros, it is possible to achieve much faster "input-sparsity" runtime using hashing-based sketching matrices. It is possible to further beat this time in the presence of additional structure on Z. Moreover, the present method provides for more accurate sketching techniques designed for nonlinear and nonparametric regression. For example, there is considered a basic problem of fitting a polynomial model, $b = \sum_{i=1}^q \beta_i z^i$ to a set of samples $(z_i, b_i) \in R \times R$, i=1, ..., n. Then, the design matrix Z has Vandermonde structure which can be exploited in a regression solver. It is particularly appealing to estimate non-parametric models on large datasets.

To be able to precisely describe the structure on Z, the description herein refers to the following definitions: (Vandermonde Matrix) Let $x_0, x_1, \ldots, x_{n-1}$ be real numbers. The Vandermonde matrix, denoted $V_{q,n}(x_0, x_1, \ldots, x_{n-1})$, has the form:

$$V_{q,n}(x_1, x_1, \ldots, x_{n-1}) = \begin{pmatrix} 1 & 1 & \ldots & 1 \\ x_0 & x_1 & \ldots & x_{n-1} \\ \ldots & \ldots & \ldots & \ldots \\ x_0^{q-1} & x_1^{q-1} & \ldots & x_{n-1}^{q-1} \end{pmatrix}$$

Vandermonde matrices of dimension q×n require only O(n) implicit storage and admit $O(n \log^2 q)$ matrix-vector multiplication time. The following matrix operator $T_q$ to map a matrix A to a block-Vandermonde structured matrix is now defined:

(Matrix Operator) Given a matrix $A \in R^{n \times d}$, the following matrix is defined: $T_q(A) = [V_{q,n}(A_{1,1}, \ldots, A_{n,1})^T V_{q,n}(A_{1,2}, \ldots, A_{n,2})^T \ldots V_{q,n}(A_{1,d}, \ldots, A_{n,d})^T]$ There are considered herein regression problems of the type of equation (1) where Z can be written as:

$$Z = T_q(A) \quad (2)$$

for an n×d matrix A, so that k=dq. The operator t expands each feature (column) of the original dataset A to q columns of Z by applying monomial transformations upto degree q−1. This lends a block-Vandermonde structure to Z. Such structure naturally arises in polynomial interpolation problems, but also applies more broadly to non-parametric additive models and kernel methods as discussed below. Given these, one embodiment is to solve the following "Structured Regression" problem:

Structured Regression: Given A and b, with constant probability output a vector $x' \in C$ for which $$\|T_q(A)x'-b\|_p \leq (1+\epsilon) \|T_q(A)x'-b\|_p$$

for an accuracy parameter >0, where $x^* = \operatorname{argmin}_{x \in C} \|T_q(A)x-b\|_p$.

In one embodiment, the system and method provides as follows: For p=2, an algorithm that solves the structured regression problem above in time $O(nnz(A)\log^2 q)+(dq\epsilon^{-1})$ or $O(nnz(A)\log^2 q)+poly(dq/\epsilon)$. By combining sketching methods with preconditioned iterative solvers, logarithmic dependence can be obtained on ε. For p=1, an algorithm is provided with runtime $O(nnz(A) \log n \log^2 q)+(dq\epsilon^{-1}\log n)$. This implies that moving from linear (i.e, Z=A) to nonlinear regression ($Z=T_q(A)$)) incurs only a mild additional $\log^2 q$ runtime cost, while requiring no extra storage. Since $nnz(T_q(A))=qnnz(A)$, this provides a sketching approach that operates faster than "input-sparsity" time. These algorithms apply to a broad class of nonlinear models for both least squares regression and their robust $l_1$ regression counterparts. While polynomial interpolation and additive models with monomial basis functions are immediately covered by the methods herein, it can also be shown that under a suitable choice of the constraint set C, the structured regression problem with $Z=T_q(AG)$ for a Gaussian random matrix G approximates non-parametric regression using the Gaussian kernel. The present system and method provides a more flexible modeling framework when compared to randomized Fourier maps for kernel methods. Empirical results confirm both the practical value of the modeling framework, as well as speedup benefits of sketching.

In one embodiment, the development of randomized solvers for block-Vandermonde structured $l_p$ regression problems are now described with consideration given to convex constraint sets C.

Given a matrix $M\in R^{n\times d}$, let $M_1, \ldots, M_d$ be the columns of M, and $M^1, \ldots, M^n$ be the rows of M. Define $\|M\|_1$ to be the element-wise $l_1$ norm of M. That is, $\|M\|_1=\Sigma_{i\in[d]}\|M_i\|_1$. Let $\|M\|_F=(\Sigma_{i\in[n],j\in[d]}M_{i,j}^2)^{1/2}$ be the Frobenius norm of M. Let $[n]=\{1, \ldots, n\}$.

Well-Conditioning and Sampling of A Matrix

Given a matrix $M\in R^{n\times d}$, it is said that M is $(\alpha,\beta,1)$-well-conditioned if (1) $\|x\|_\infty \leq \beta \|Mx\|_1$ for any $x\in R^d$, and (2) $\|M\|_1 \leq \alpha$.

Suppose S is an $r\times n$ matrix so that for all $x\in R^d$, $\|Mx\|_1 \leq \|SMx\|_1 \leq \kappa \|Mx\|_1$. Letting Q·R be a QR-decomposition of SM, so that QR=SM and Q has orthonormal columns. Then $MR^{-1}$ is $(d\sqrt{r}, \kappa, 1)$-well-conditioned.

Suppose U is an $(\alpha,\beta,1)$-well-conditioned basis of an $n\times d$ matrix A. For each $i\in[n]$, let $$p_i \geq \min\left(1, \frac{\|U_i\|_1}{t\|U\|_1}\right), \text{ where } t \geq 32\alpha\beta\left(d\ln\left(\frac{12}{\epsilon}\right)+\ln\left(\frac{2}{\delta}\right)\right)/(\epsilon^2).$$

Suppose each row is independently sampled with probability $p_i$, and a diagonal matrix S created where $S_{i,i}=0$ if i is not sampled, and $S_{i,i}=1/p_i$ if i is sampled. Then, with probability at least $1-\delta$, simultaneously for all $x\in R^d$ this results in:

$$|\|SAx\|_1-\|Ax\|_1| \leq \epsilon\|Ax\|_1.$$

The following method may be employed to quickly obtaining approximations to the $p_i$'s. Letting $U\in R^{n\times d}$ be an $(\alpha,\beta,1)$-well-conditioned basis of an $n\times d$ matrix A. Suppose G is a $d\times O(\log n)$ matrix of i.i.d. Gaussians. Let $$p_i = \min\left(1, \frac{\|U_i G\|_1}{t 2\sqrt{d} \|UG\|_1}\right)$$

for all i, where t is as defined above. Then with probability $1-1/n$, over the choice of G, the following occurs: If each row is sampled with probability $p_i$, and S is created, then with probability at least $1-\delta$, over a choice of sampled rows, simultaneously for all $x\in R^d$ there is had:

$$|\|SAx\|_1-\|Ax\|_1| \leq \epsilon\|Ax\|_1.$$

This is referred to herein as "Theorem 6" as used in an algorithm depicted in FIG. 6.

Oblivious Subspace Embeddings

Further, letting $A\in R^{n\times d}$ and assuming that n>d, let nnz(A) denote the number of non-zero entries of A. Further assuming $nnz(A)\geq n$ and that there are no all-zero rows or columns in A, then for $l_2$ Norm: For a parameter t, there is defined a random linear map $\Phi D:R^n\to R^t$ according to the following family of matrices:

$h:[n]\mapsto[t]$ is a random map so that for each $i\in[n]$, $h(i)=t'$ for $t'\in[t]$ with probability $1/t$.

$\Phi\in\{0,1\}^{t\times n}$ is a $t\times n$ binary matrix with $\Phi_{h(i),i}=1$, and all remaining entries 0.

D is an $n\times n$ random diagonal matrix, with each entry independently chosen to be +1 or −1 with equal probability.

A quantity $\pi=\Phi D$ is referred to as a sparse embedding matrix.

For certain t, and with probability at least .99 over the choice of $\phi$ and D, for any fixed $A\in R^{n\times d}$, there is had simultaneously for all $\in R^d$, $$(1-\epsilon)\cdot\|Ax\|_2 \leq \|\pi Ax\|_2 \leq (1+\epsilon)\cdot\|Ax\|_2,$$

that is, the entire column space of A is preserved. The best known value of t is $t=O(d^2/\epsilon^2)$.

There is also used an oblivious subspace embedding known as the subsampled randomized Hadamard transform, or SRHT.

There is a distribution over linear maps $\pi'$ such that with probability 0.99 over the choice of $\pi'$, for any fixed $A\in R^{n\times d}$, there is had simultaneously for all $x\in R^d$, $$(1-\epsilon)\cdot\|Ax\|_2 \leq \|\pi' Ax\|_2 \leq (1+\epsilon)\cdot\|Ax\|_2,$$

where the number of rows of $\pi$ is $t'=O(\epsilon^{-2}(\log d)(\sqrt{d}+\sqrt{\log n})^2)$, and the time to compute $\pi'A$ is $O(nd \log t')$. This is referred to herein as "Theorem 7" as used in an algorithm depicted in FIG. 5.

For the $l_1$ Norm: The results can be generalized to subspace embeddings with respect to the $l_1$-norm. In one embodiment, the goal is to design a distribution over matrices $\Psi$, so that with probability at least 0.99, for any fixed $A\in R^{n\times d}$, simultaneously for all $X\in R^d$, $$\|Ax\|_1 \leq \|\Psi Ax\|_1 \leq \kappa\|Ax\|_1,$$

where $\kappa>1$ is a distortion parameter. The best known value of $\kappa$, independent of d, is $\kappa=O(d^2\log^2 d)$. Their family of matrices $\Psi$ is chosen to be of the form $\pi\cdot E$, where $\pi$ is as above with parameter $t=d^{1+\gamma}$ for arbitrarily small constant $\gamma>0$, and E is a diagonal matrix with $E_{i,i}=1/u_i$, where $u_1, \ldots, u_n$ are independent standard exponentially distributed random variables.

An exponential distribution has support $x\in[0,\infty)$, probability density function (PDF) $f(x)=e^{-x}$ and cumulative distribution function (CDF) $F(x)=1-e^{-x}$. A random variable X is exponential if X is chosen from the exponential distribution.

Fast Vandermonde Multiplication

Let $x_0, \ldots, x_{n-1}\in R$ and $V=V_{q,n}(x_0, \ldots, x_{n-1})$. For any $y\in R^n$ and $z\in R^q$, the matrix-vector products Vy and $V^Tz$ can be computed in $O((n+q)\log^2 q)$ time.

Main Lemmas: Norms $l_2$ and $l_1$ are handled separately. A first sketching matrix multiplication algorithm entitled Algorithm 1 (StructRegression-2) 100 is shown in FIG. 5. A second sketching matrix multiplication algorithm entitled Algorithm 2 (StructRegression-1) 150 is shown in FIG. 6. The present method and system uses these subroutines in accordance with the following lemmas discussed below:

For a Lemma (Lemma 9) referred to in FIG. 5: Efficient Multiplication of a Sparse Sketch and $T_q(A)$: let $A \in R^{n \times d}$ and let $\pi = \Phi D$ be a sparse embedding matrix for the $l_2$ norm with associated hash function $h:[n] \to [t]$ for an arbitrary value of t, and let E be any diagonal matrix. There is a deterministic algorithm 100 of FIG. 5 to compute the product $\Phi \cdot D \cdot E \cdot T_q(A)$ in $O((nnz(A)+dtq)\log^2 q)$ time.

FIG. 5 shows a first algorithm entitled Algorithm 1 (StructRegression-2) 100 for lp-2 regression (e.g., corresponding to a sum of squares of distances of each data point to the curve).

For a Lemma (Lemma 10) referred to in FIG. 6: Efficient Multiplication of $T_q(A)$ on the Right: Let $A \in R^{n \times d}$. For any vector z, there is a deterministic algorithm to compute the matrix vector product $T_q(A) \cdot z$ in $O((nnz(A)+dq)\log^2 q)$ time.

For a Lemma (Lemma 11): Efficient Multiplication of $T_q(A)$ on the Left: there is provided $A \in R^{n \times d}$. For any vector z, there is a deterministic algorithm to compute the matrix vector product $z \cdot T_q(A)$ in $O((nnz(A)+dq)\log^2 q)$ time.

As mentioned, for Fast $l_2$-regression, there is considered the structured regression problem in the case p=2 addressable by algorithm 100 of FIG. 5. That is, Algorithm StuctRegression-2 solves the structured regression with p=2 in time:

$$O(nnz(A)\log^2 q)+(dq/\epsilon) \text{ or } O(nnz(A)\log^2 q)+poly(dq/\epsilon).$$

Proof. By the properties of a sparse embedding matrix (see Oblivious Subspace Embeddings), with probability at least 0.99, for $t=O((dq)^2/\epsilon^2)$, there is had simultaneously for all y in the span of the columns of $T_q(A)$ adjoined with b, $$(1-\epsilon)\|y\|_2 \le \|\pi y\|_2 \le (1+\epsilon)\|y\|_2,$$

since the span of this space has dimension at most dq+1. By previously referred to Theorem 7, with a probability had of 0.99, for all vectors z in the span of the columns of $\pi(T_q(A) \circ b)$, $$(1-\epsilon)\|z\|_2 \le \|\pi' z\|_2 \le (1+\epsilon)\|z\|_2.$$

It follows that for all vectors $x \in R^d$, $$(1-O(\epsilon))\|T_q(A)x-b\|_2 \le Pi'\pi(T_q(A)x-B)\|_2 \le (1+O(\epsilon))\|T_q(A)x-b\|_2.$$

It follows by a union bound that with probability at least 0.98, the output of StructRegression-2 algoirthm 100 is a $(1+\epsilon)$-approximation.

For the time complexity, $\pi T_q(A)$ can be computed in $O((nnz(A)+dtq)\log^2 q)$ by Lemma 9, while $\pi b$ can be computed in O(n) time. The remaining steps can be performed in $(dq/\epsilon)$ time, and therefore the overall time is $O(nnz(A)\log^2 q)+(dq/\epsilon)$. Alternately, these steps can be performed in poly $(dq/\epsilon)$ time, and therefore the overall time is $O(nnz(A)\log^2 q)+poly(dq/\epsilon)$.

Logarithmic Dependence on $1/\epsilon$

The StructRegression-2 algorithm 100 can be modified to obtain a running time with a logarithmic dependence on $\epsilon$ by combining sketching-based methods with iterative ones.

Algorithm I solves the structured regression problem with p=2 in time $O((nnz(A)+dq)\log(1/\epsilon))+(dq)$. Alternately, it can be solved in an overall time of $O((nnz(A)+dq)\log(1/\epsilon))+poly(dq)$.

Fast $l_1$-Regression

Now considering the structured regression in the case p=1. The algorithm 150 (FIG. 6) in this case is more complicated than the case for p=2.

Algorithm StructRegression-1 solves the structured regression in problem with p=1 in time $O(nnz(A)\log n \log^2 q)+(dq\epsilon^{-1}\log n)$.

It is noted that when there is a convex constraint set C the only change in the above algorithms is to optimize over $x' \in C$.

Polynomial Fitting, Additive Models and Random Fourier Maps

In one embodiment, various sketching approaches for a versatile class of Block-Vandermonde structured regression problems are motivated by showing that these problems arise naturally in various statistical modeling settings.

The most basic application is the one-dimensional (d=1) polynomial regression.

In multivariate additive regression models, a continuous target variable $y \in R$ and input variables $z \in R^d$ are related through the model $y = \mu + \sum_{i=1}^{d} f_i(z_i) + \epsilon_i$ where $\mu$ is an intercept term, $\epsilon_i$ are zero-mean Gaussian error terms and $f_i$ are smooth univariate functions. Each function may be expanded as $f_i(\cdot) = \sum_{t=1}^{q} \beta_{i,t} h_{i,t}(\cdot)$ using basis functions $h_{i,t}(\cdot)$ and estimate the unknown parameter vector $x = [\beta_{11} \ldots \beta_{1q} \ldots \beta_{dq}]^T$ typically by a constrained or penalized least squares model, $\text{argmin}_{x \in C} \|Zx-b\|_2^2$ where $b = (y_1 \ldots y_n)^T$ and $Z = [H_1 \ldots H_q] \in R^{n \times dq}$ for $(H_i)_{j,t} = h_{i,t}(z_j)$ on a training sample $(z_i, y_i), i=1 \ldots n$. The constraint set C typically imposes smoothing, sparsity or group sparsity constraints. It is easy to see that choosing a monomial basis $h_{i,s}(u) = u^s$ immediately maps the design matrix Z to the structured regression form of Equation 2). For p=1, the algorithms presented herein also provide fast solvers for robust polynomial additive models.

Additive models impose a restricted form of univariate nonlinearity which ignores interactions between covariates. Denoting an interaction term as $z^\alpha = z_1^{\alpha_1} \ldots z_d^{\alpha_d}, \alpha = (\alpha_1 \ldots \alpha_d)$ where $\Sigma_i \alpha_i = q, \alpha_i \in \{0 \ldots q\}$, a degree-q multivariate polynomial function space $P_q$ is spanned by $\{z^\alpha, \alpha \in \{0, \ldots q\}^d, \Sigma_i \alpha_i \le q\}$. $P_q$ admits all possible degree-q interactions but has dimensionality $d^q$ which is computationally infeasible to explicitly work with except for low-degrees and low-dimensional or sparse datasets. Kernel methods with polynomial kernels $k(z,z') = (z^T z')^q = \Sigma_\alpha z^\alpha z'^\alpha$ provide an implicit mechanism to compute inner products in the feature space associated with $P_q$. However, they require $O(n^3)$ computation for solving associated kernelized (ridge) regression problems and $O(n^2)$ storage of dense n×n Gram matrices K (given by $K_{ij} = k(Z_i, Z_j)$), and therefore do not scale well.

For a d×D matrix G let $S_G$ be the subspace spanned by $$\left\{\left(\sum_{i=1}^{d} G_{ij} z_i\right)^t, t=1 \ldots q, j=1 \ldots D\right\}.$$

Assuming $D = d^q$ and that G is a random matrix of i.i.d Gaussian variables, then almost surely there is had $S_G = P_q$. An intuitively appealing explicit scalable approach is then to use $D = d^q$. In that case $S_G$ essentially spans a random subspace of $P_q$. The design matrix for solving the multivariate polynomial regression restricted to $S_G$ has the form $Z = T_q(AG)$ where $A = [z_1^T \ldots z_n^T]^T$.

This scheme can be related to the idea of random Fourier features in the context of approximating shift-invariant kernel functions, with the Gaussian Kernel $k(z,z') = \exp(-\|z-z'\|_2^2/2\sigma^2)$ as the primary example. By appealing to Bochner's Theorem, it is shown that the Gaussian kernel is the Fourier transform of a zero-mean multivariate Gaussian distribution with covariance matrix $\sigma^{-1} I_d$ where $I_d$ denotes the d-dimensional identity matrix, $$k(z,z') = \exp(-\|z-z'\|_2^2/2\sigma^2) = E_{\omega:N(0,\sigma^{-1}I_d)}[\varphi_\omega(z)\varphi_\omega(z')^*]$$

where $\varphi_\omega(z)=e^{i\omega'z}$. An empirical approximation to this expectation can be obtained by sampling D frequencies $\omega:N(0_d,\sigma^{-1}I_d)$ and setting $$k(z, z') = \frac{1}{D}\sum_{i=1}^{D} \phi_{\omega_i}(z)\phi_{\omega_i}(z)^*.$$

This implies that the Gram matrix of the Gaussian kernel, $K_{ij}=\exp(-\|z_i-z_j\|_2^2/2\sigma^2)$ may be approximated with high concentration as $K \approx RR^T$ where $R=[\cos(AG)\sin(AG)] \in R^{n \times 2D}$ (sine and cosine are applied elementwise as scalar functions). This randomized explicit feature mapping for the Gaussian kernel implies that standard linear regression, with R as the design matrix, can then be used to obtain a solution in time $O(nD^2)$. By taking the Maclaurin series expansion of sine and cosine upto degree q, it can be seen that a restricted structured regression problem of the form, $\text{argmin}_{x \in range(Q)} \|T_q(AG)x-b\|_p$, where the matrix $Q \in R^{2Dq \times 2D}$ contains appropriate coefficients of the Maclaurin series, will closely approximate the randomized Fourier features construction. By dropping or modifying the constraint set $x \in range(Q)$, the setup above, in principle, can define a richer class of models.

Two sets of experiments on example classification and regression datasets are now described. The first set of experiments compares generalization performance of the structured nonlinear least squares regression models against standard linear regression, and nonlinear regression with random fourier features. The second set of experiments focus on scalability benefits of sketching.

FIG. 7 shows a comparison of testing error and training time of the different methods in the form of a generalization performance Table 175.

In the table, n is number of training instances, d is the number of features per instance and k is the number of instances in the test set. "Ord. Reg." stands for ordinary '2 regression. "Add. Poly. Reg." stands for additive polynomial '2 regression. For classification tasks, the percent of testing points incorrectly predicted is reported. For regression tasks, it is reported that $\|y_p-y\|_2/\|y\|$ where $y_p$ is the predicted values and y is the ground truth.

In ordinary $l_2$ linear regression as depicted at column 176 is very fast, especially if the matrix is sparse. However, it delivers only mediocre results. The results improve somewhat with additive polynomial regression at column 177. Additive polynomial regression at column 177 maintains the sparsity structure so it can exploit fast sparse solvers. Once random features (D) are introduced at column 178, thereby introducing interaction terms, results improve considerably. When compared with random Fourier features as depicted in FIG. 7 at 179, for the same number of random features D, additive polynomial regression with random features get better results than regression with random Fourier features. If the number of random features is not the same, then if $D_{Fourier}=D_{Poly} \cdot q$ (where $D_{Fourier}$ is the number of Fourier features, and $D_{Poly}$ is the number of random features in the additive polynomial regression) then regression with random Fourier features shows an improvement compared to additive polynomial regression with random features. However, computing the random features is one of the most expensive steps, so computing better approximations with fewer random features is desirable.

Figure 8A:
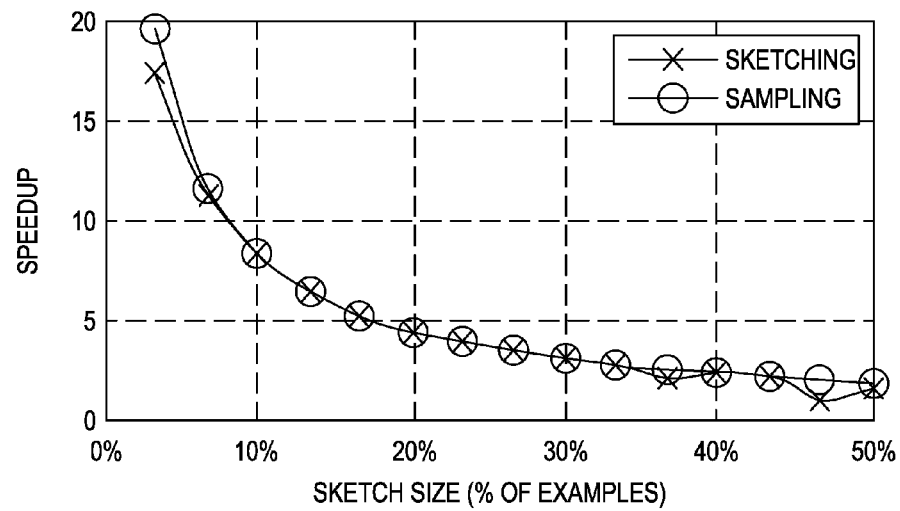
FIGS. 8A-8C show example performance plots of sketching and reports the benefit of sketching in terms of running times, and the trade-off in terms of accuracy.
Figure 8B:
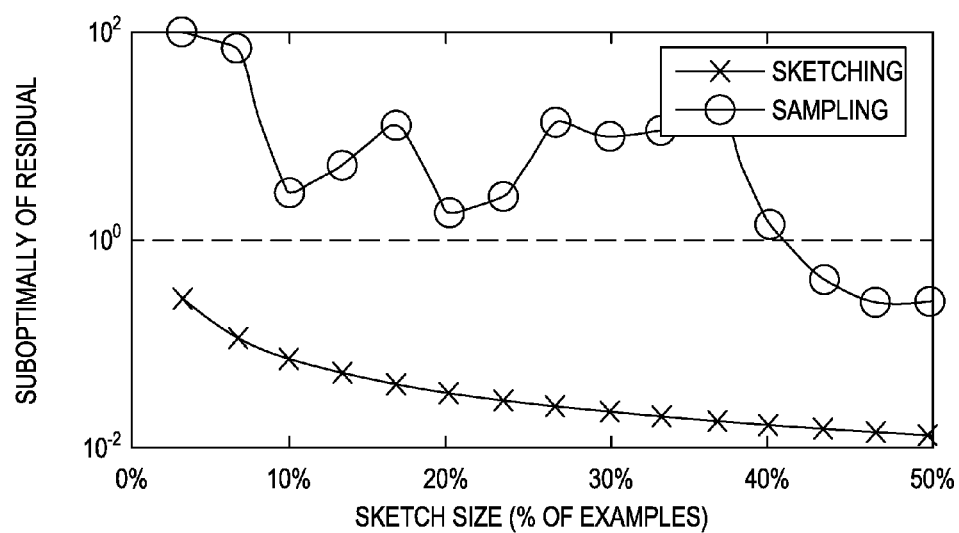
Figure 8C:
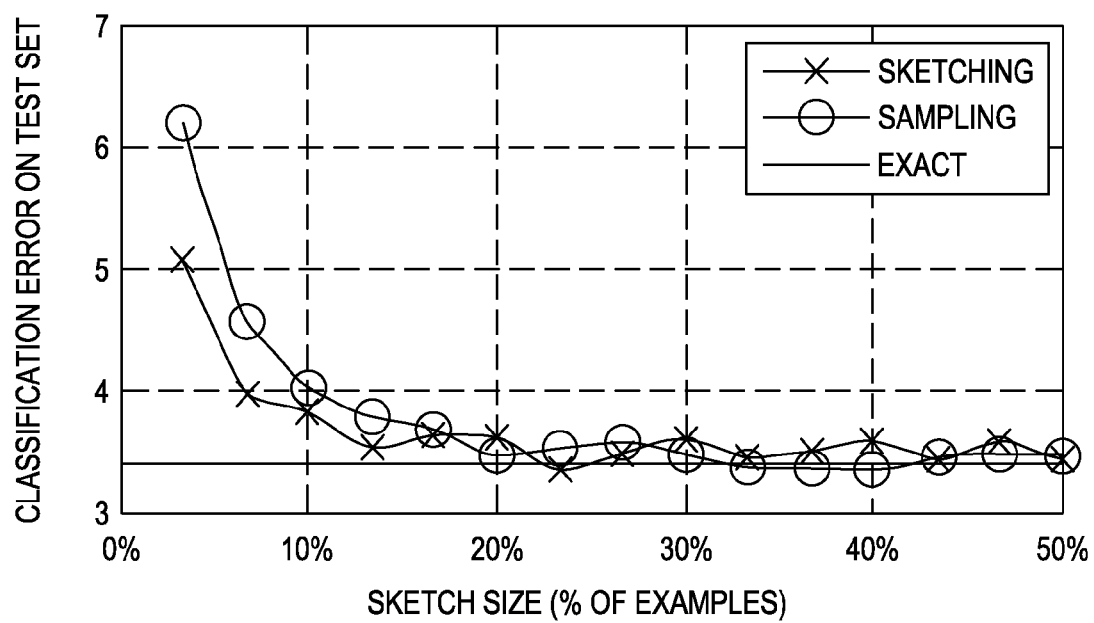

FIGS. 8A-8C show example performance plots of sketching and reports the benefit of sketching in terms of running times, and the trade-off in terms of accuracy. In this experiment, a larger sample of the mnist dataset is used with 300,000 examples. An example amount of 1,500 random features are computed, and then the corresponding additive polynomial regression problem solved with q=4, both exactly and with sketching to different number of rows. Additionally tested was a sampling based approach which simply randomly samples a subset of the rows (no sketching). FIG. 8A is a plot 180 of the speedup of the sketched method relative to the exact solution. In these experiments a non-optimized straightforward implementation is used that does not exploit fast Vandermonde multiplication or parallel processing. Therefore, running times were measured using a sequential execution. In one embodiment, the time required to solve the regression problem was measured. For this experiment a machine with two quad-core Intel E5410 @ 2.33 GHz, and 32 GB DDR2 800 MHz RAM was used. FIG. 8B explores as plot 185 the sub-optimality in solving the regression problem. More specifically, there is plotted $(\|Y_p-Y\|_F-\|Y_p-Y\|_F)/\|Y_p^*-Y\|_F$ where Y is the labels matrix, $Y_p^*$ is the best approximation (exact solution), and $Y_p$ is the sketched solution. It is observed that the error decreases as the size of the sampled matrix grows, and that with a sketch size that is not too big there is about a 10% larger objective. In FIG. 8C it is observed in a plot 190 that this translates to an increase in error rate. Encouragingly, a sketch as small as 15% of the number of examples is enough to have a very small increase in error rate, while still solving the regression problem more than 5 times faster (the speedup is expected to grow for larger datasets).

Thus, in one embodiment, there is provided methods to reduce floating point operations and reduce communication costs in parallel and distributed systems Moreover, the methods employed do this by reducing the size or "sketching" the data in such a way as to approximately retain statistical performance of downstream algorithms. The reduction in size leads to reduction in FLOPS. The sketched dataset can fit in memory of a single node or multiple nodes in a cluster.

Figure 3:
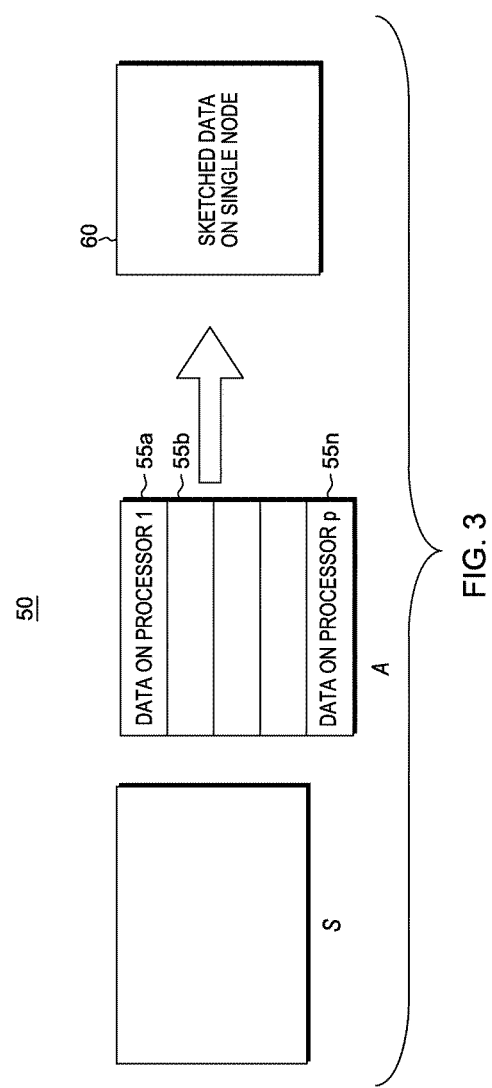
FIG. 3 shows a depiction 50 of implementing processors "p" 55a, . . . 55n configured to locally apply the same sketching matrix S to their data, and communicate corresponding results to a centralized processor in one embodiment.

FIG. 3 shows an example implementation of a processing system 50 including multiple processors 55a, . . . 55n configured to locally apply the same sketching matrix S to their data, and send corresponding results to a central processor that is configured to compute and obtain the sketch of the entire matrix 60 on a local computing machine. This involves each processor computing $S^*(A^i)$ for his/her local share $A^i$ of the matrix A, where $$A = \sum_i A^i.$$

The method also eliminates the need to do out-of-core computations and I/O cost of scanning the data. For example, communication or out-of-core solutions can be avoided by sketching the data so it fits in single node or aggregate memory.

The methods described herein can directly accelerate a wide variety of practical predictive analytics systems, e.g., speech recognition, image classification, text categorization etc.

That is, in a predictive analytics system, e.g., speech recognition, image classification, text categorization, involving fast nonlinear regression and classification where the data matrix has specific structure, processing method comprises: sketching the data (input, output) using sparse embedding matrices (hashing) and structured random matrices; utilizing structure in the data to accelerate sketching.

Figure 4:
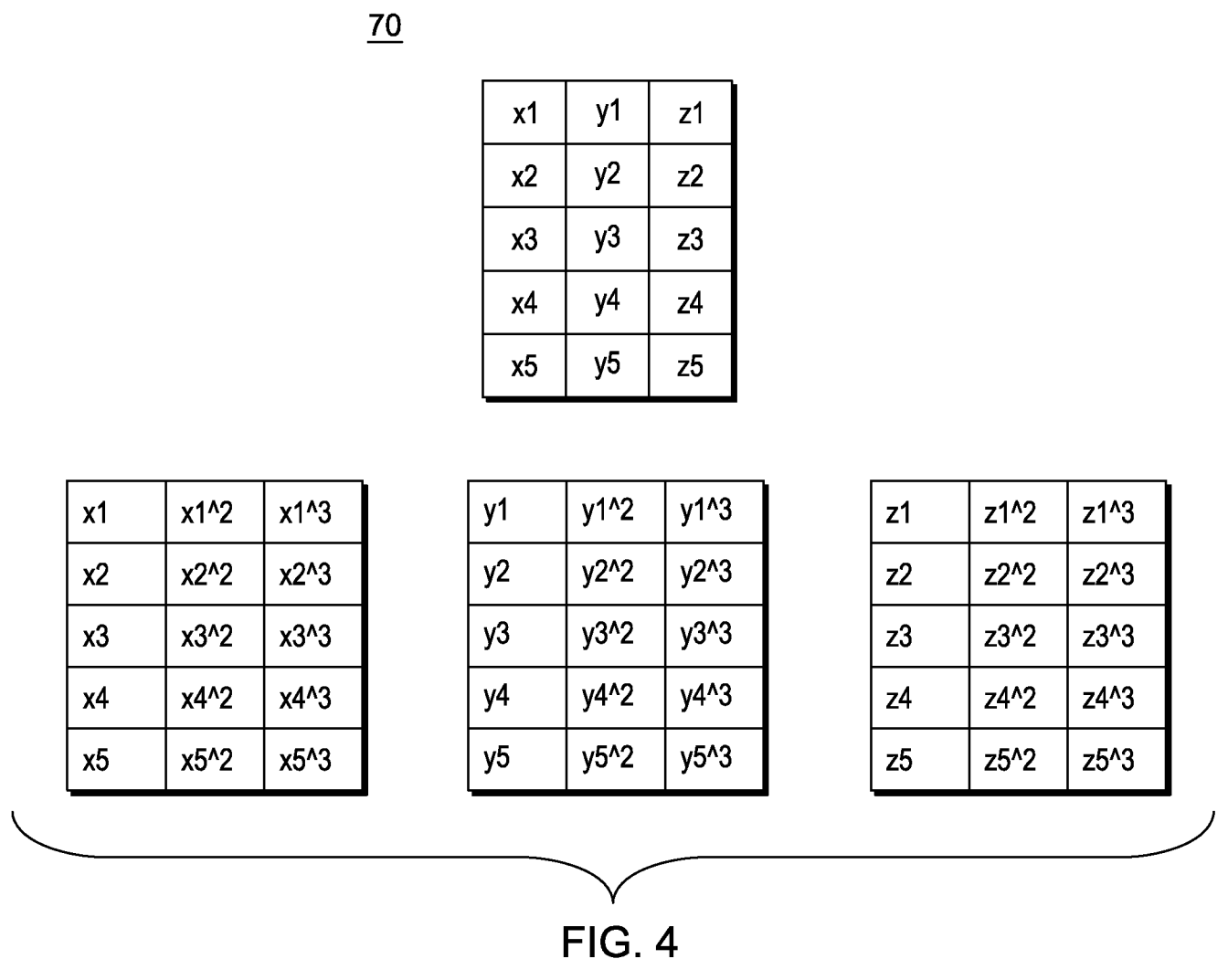

FIG. 4 shows an example data structure 70 used in Vandermonde matrices that helps achieve a faster processing method, and indicates several applications, such as polynomial fitting and multivariate polynomial fitting.

The methods described herein, reduce FLOPS, communication costs and/or data scan costs for out-of-core computations and solves a reduced regression problem on the sketched data. In one embodiment, the structured matrix is implicitly generated from original data features (additive models). In another embodiment, a structured matrix is implicitly generated from random combinations of original data features (interaction terms) where the modeling problem is least squares regression (12) or robust regression (11). For robust regression 11, modified steps apply. For example, such processing handles the following types of problems: (1) Polynomial fitting of a form such as, e.g., $$Y = \sum_i X^i a_i; \quad (2)$$

Additive models (multivariate polynomial fitting), e.g., $$Y = \sum_i T_q(X_i) a_i;$$

and (3) Interaction terms, e.g., $X_i = (ZG)_i$. These techniques may extend to other structured matrices, and other classes of problems (e.g., low-rank approximations).

Figure 9:
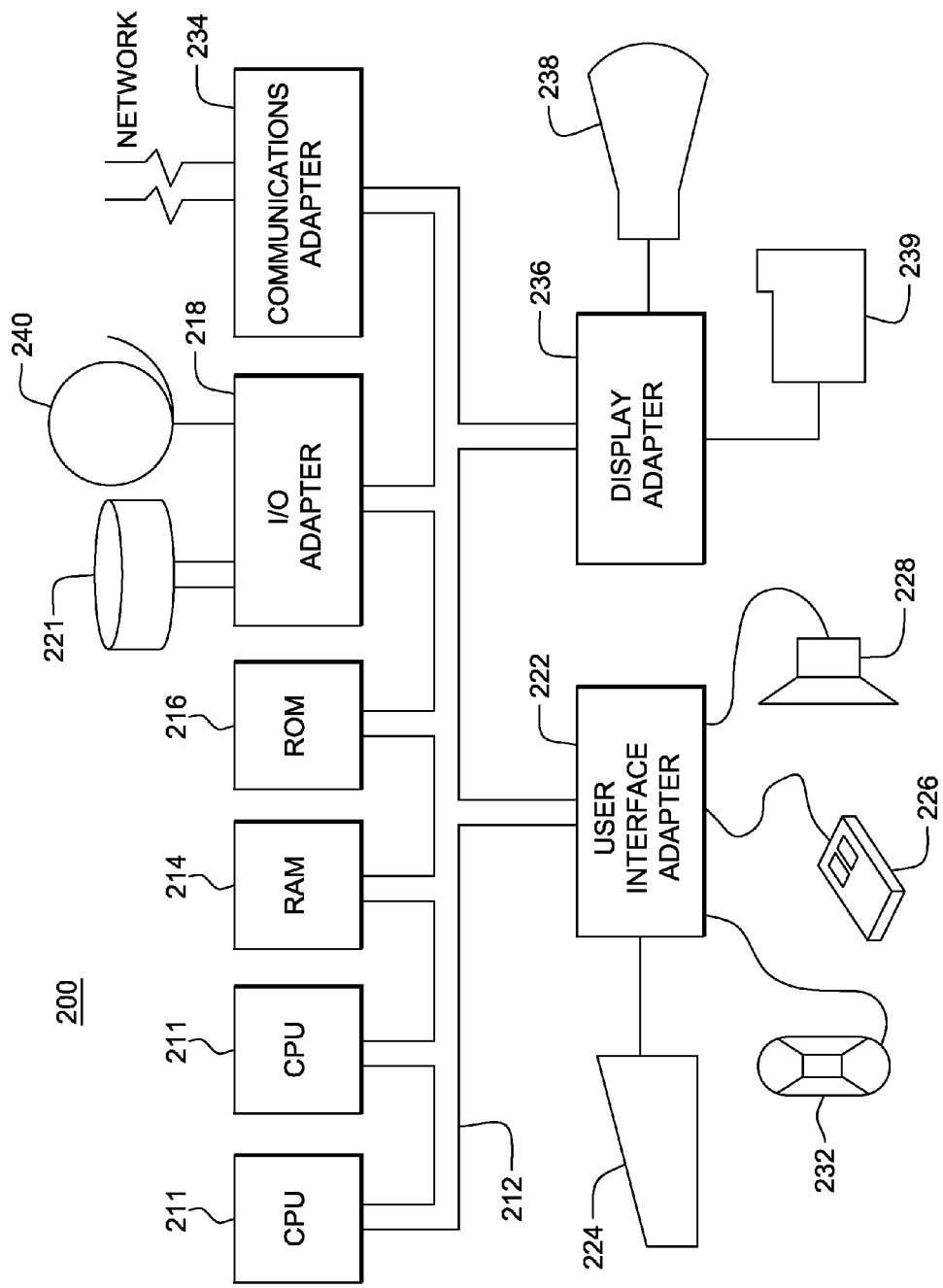
FIG. 9 illustrates an exemplary hardware configuration of a computing system infrastructure 200 in which the present methods are run.

FIG. 9 illustrates an exemplary hardware configuration of a computing or mobile device computing system infrastructure 200 in which the present methods are run. In one aspect, computing system 200 receives the search results from a user input search query in a mapping application, and is programmed to perform the method processing steps of FIGS. 2A-2C, 3 etc. The hardware configuration preferably has at least one processor or central processing unit (CPU) 211. The CPUs 211 are interconnected via a system bus 212 to a random access memory (RAM) 214, read-only memory (ROM) 216, input/output (I/O) adapter 218 (for connecting peripheral devices such as disk units 221 and tape drives 240 to the bus 212), user interface adapter 222 (for connecting a keyboard 224, mouse 226, speaker 228, disk drive device 232, and/or other user interface device to the bus 212), a communication adapter 234 for connecting the system 200 to a data processing network, the Internet, an Intranet, a local area network (LAN), etc., and a display adapter 236 for connecting the bus 212 to a display device 238 and/or printer 239 (e.g., a digital printer of the like).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The embodiments described above are illustrative examples and it should not be construed that the present invention is limited to these particular embodiments. Thus, various changes and modifications may be effected by one skilled in the art without departing from the spirit or scope of the invention as defined in the appended claims.

The invention claimed is:

1. A computer-implemented method involving a fast nonlinear regression problem for use in classifying an image for an image classification system, said method comprising:
receiving, at a hardware processor of a computer system, input data corresponding to a image feature design matrix (A) of values representing an image, wherein matrix (A) is an n×d matrix where n>d, and receiving data representing a corresponding output data target vector (b), and
forming, at the hardware processor, a nonlinear regression problem to be solved, said nonlinear regression problem being of a form $\min_{x \in C} \|Ax-b\|_p$, where x is a matrix, p is an 1-2 norm, and C is a constraint set; and
modifying said nonlinear regression problem by:
applying, using said hardware processor, a matrix operator $T_q$ to said matrix (A) to generate data representing a block-Vandermonde structured matrix $T_q(A)$, said $T_q(A)$ expanding matrix (A) to an (n× (dq)) matrix, said block-Vandermonde structured matrix having a fast vector-matrix method associated therewith;
generating, using said hardware processor, a sparse embedding matrix for said 1-2 norm with an associated hash function;
multiplying, using said hardware processor, said spare embedding matrix with said $T_q(A)$ to obtain a first product;
multiplying, using said hardware processor, said spare embedding matrix with said vector (b) to obtain a second product; and
running an iterative regression solver device on said modified nonlinear regression problem with p=2 to generate an output vector for said image classification system, said regression solver generating said output vector in an accelerated time according to:
$O(nnz(A)\log^2 q) + poly(dq/\epsilon)$, where nnz(A) represents a number of non-zero entries of the matrix A and $\epsilon$ is a pre-specified accuracy parameter $\epsilon>0$,
wherein said output vector is used in classifying said image.

2. The computer-implemented method of claim 1, wherein the $T_q(A)$ expands said matrix A to said (n ×(dq)) matrix by replacing each entry $A_{i,j}$ with a q-tuple (1, $A_{i,j}$, $A_{i,j}^2$, ... $A_{i,j}^{q-1}$).

3. The computer-implemented method of claim 2, wherein the generated output vector is an output vector x' that satisfies $|Ax'-b|_p \le (1+eps) \min_x |Ax-b|_p$, where eps ($\epsilon$)>0 is a user-specified accuracy parameter.

4. The computer-implemented method of claim 3, further comprising:
solving said modified regression problem with p =2 in a time according to:
$O((nnz(A)+dq)\log(1/\epsilon))+poly(dq)$, where nnz(A) represents a number of non-zero entries of the matrix A.

5. The computer-implemented method according to claim 3, further comprising:
solving said modified regression problem with p=1 in a time according to:
$O(nnz(A)\log n \log^2 q) + (dq\epsilon^{-1} \log n)$, where nnz(A) represents a number of non-zero entries of the matrix A.

6. A computer-implemented image classification system involving a fast nonlinear regression problem for use in classifying an image comprising:
a memory;
a hardware processor coupled to the memory, the hardware processor configured to:
receive input data corresponding to a image feature design matrix (A) of values representing an image, wherein matrix (A) is an n×d matrix where n>d, and receiving data representing a corresponding output data target vector (b), and
form a nonlinear regression problem to be solved, said nonlinear regression problem being of a form $\min_{x \in C} \|Ax-b\|_p$, where x is a matrix, p is an 1-2 norm, and C is a constraint set; and
modify said nonlinear regression problem by:
applying, using said hardware processor, a matrix operator $T_q$ to said matrix (A) to generate data representing a block-Vandermonde structured matrix $T_q$ (A), said $T_q(A)$ expanding matrix (A) to an (n×(dq)) matrix, said block-Vandermonde structured matrix having a fast vector-matrix method associated therewith;

generating, using said hardware processor, a sparse embedding matrix for said 1-2 norm with an associated hash function;

multiplying, using said hardware processor, said spare embedding matrix with said $T_q(A)$ to obtain a first product;

multiplying, using said hardware processor, said spare embedding matrix with said vector (b) to obtain a second product; and run an iterative regression solver device on said modified nonlinear regression problem with p =2 to generate an output vector for said image classification system, said regression solver generating said output vector in an accelerated time according to:

$O(nnz(A)\log^2 q)+poly(dq/\epsilon)$ , where nnz(A) represents a number of non-zero entries of the matrix A and $\epsilon$ is a pre-specified accuracy parameter $\epsilon>0$, wherein said output vector is used in classifying said image.

7. The system of claim 6, wherein the $T_q(A)$ expands said matrix A to said (n ×(dq)) matrix by replacing each entry $A_{i,j}$ with a q-tuple $(1, A_{i,j}, A_{i,j}^2, \ldots, A_{i,j}^{q-1})$.

8. The system of claim 6,
wherein the generated output vector is an output vector x' that satisfies $|Ax'-b|_p \leq (1+eps) \min_x |Ax-b|_p$, where eps $(\epsilon)>0$ is a user-specified accuracy parameter.

9. A computer program product for an image classification system involving a fast nonlinear regression problem used to classify an image, the computer program product comprising a non-transitory storage medium readable by a processing circuit, the computer program product storing instructions run by the processing circuit for performing method steps comprising:

receiving, at the processing circuit, input data corresponding to a image feature design matrix (A) of values representing an image, wherein matrix (A) is an n×d matrix where n>d, and receiving data representing a corresponding output data target vector (b), and forming, at the processing circuit, a nonlinear regression problem to be solved, said nonlinear regression problem being of a form $\min_{x \in C} \|Ax-b\|_p$, where x is a matrix, p is an 1-2 norm, and C is a constraint set; and modifying said nonlinear regression problem by:

applying, using said processing circuit, a matrix operator $T_q$ to said matrix (A) to generate data representing a block-Vandermonde structured matrix $T_q$ (A), said $T_q(A)$ expanding matrix (A) to an (n×(dq)) matrix, said block-Vandermonde structured matrix having a fast vector-matrix method associated therewith;

generating, using said processing circuit, a sparse embedding matrix for said 1-2 norm with an associated hash function;

multiplying, using said processing circuit, said spare embedding matrix with said $T_q(A)$ to obtain a first product;

multiplying, using said processing circuit, said spare embedding matrix with said vector (b) to obtain a second product; and running an iterative regression solver device on said modified nonlinear regression problem with p=2 to generate an output vector for said image classification system, said regression solver generating said output vector in an accelerated time according to:

$O(nnz(A)\log^2 q)+poly(dq/\epsilon)$ , where nnz(A) represents a number of non-zero entries of the matrix A and $\epsilon$ is a pre-specified accuracy parameter $\epsilon>0$, wherein said output vector is used in classifying said image.

10. The computer program product of claim 9, wherein the $T_q(A)$ expands said matrix A to an (n ×(dq)) matrix by replacing each entry $A_{i,j}$ with the q-tuple $(1, A_{i,j}, A_{i,j}^2, \ldots, A_{i,j}^{q-1})$.

11. The computer program product of claim 9, wherein the generated output vector is an output vector x' that satisfies $|Ax'-b|_p < (1+eps) \min_x |Ax-b|_p$, where eps$(\epsilon)>0$ is a user-specified accuracy parameter.

* * * * *